June 15, 1965        S. DOBA, JR        3,189,803
TRI-STATOR VARIABLE AIR-CAPACITOR
Filed Nov. 28, 1961        3 Sheets-Sheet 1
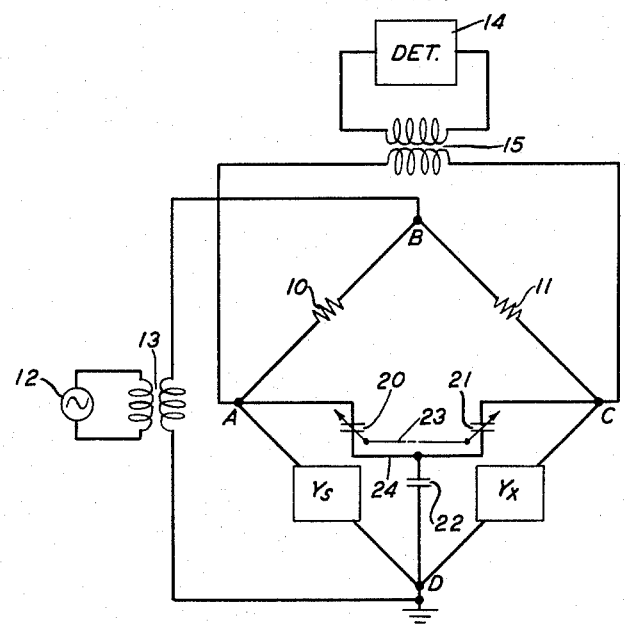
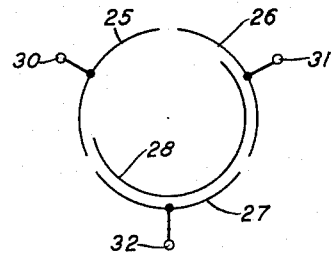
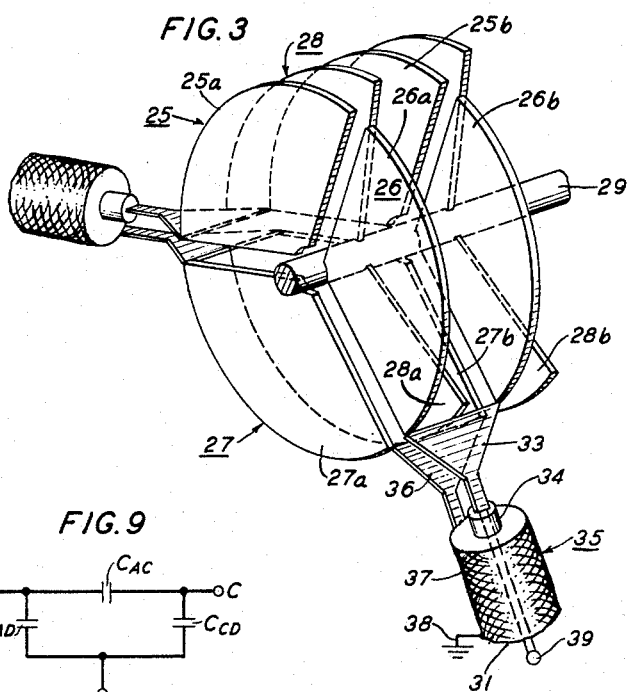
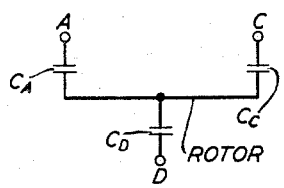
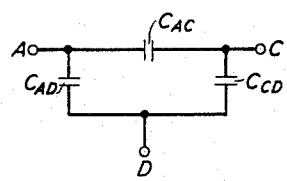
INVENTOR
S. DOBA, JR.
BY
Patrick J. Roche
ATTORNEY June 15, 1965  S. DOBA, JR  3,189,803
TRI-STATOR VARIABLE AIR-CAPACITOR
Filed Nov. 28, 1961  3 Sheets-Sheet 2

INVENTOR
S. DOBA, JR.
BY
Patrick J. Roche
ATTORNEY

June 15, 1965 S. DOBA, JR 3,189,803
TRI-STATOR VARIABLE AIR-CAPACITOR
Filed Nov. 28, 1961 3 Sheets-Sheet 3

INVENTOR
S. DOBA, JR.
BY
Patrick J. Roche
ATTORNEY

United States Patent Office 3,189,803
Patented June 15, 1965

3,189,803
TRI-STATOR VARIABLE AIR-CAPACITOR
Stephen Doba, Jr., Berkeley Heights, N.J., assignor to Bell Telephone Laboratories, Incorporated, New York, N.Y., a corporation of New York
Filed Nov. 28, 1961, Ser. No. 155,323
13 Claims. (Cl. 317—254)

This invention relates to a variable capacitor, and more specifically to such capacitor comprising three stators and a rotor free from a direct-current electrical connection extending externally of the capacitor.

Heretofore, numerous examples of the so-called butterfly air-dielectric capacitor have been known. Of these, one type disclosed in Patent No. 2,367,681 issued to E. Karplus et al. on January 23, 1945, comprises two stators, each having an angular dimension of 90 degrees, and a rotor comprising a twin-sector rotor, each sector having an angular dimension of 90 degrees, and free from a direct-current connection extending externally of the capacitor. As the twin-sectors of the rotor are oppositely disposed in one plane, the capacitor has been appropriately characterized as a butterfly-type, and is disclosed in the patent, supra, as forming the capacitive element of a tuning unit in a high-frequency oscillator. Effectively, the Karplus et al. capacitor comprises two capacitors in series and limits the angular rotation of the rotor to 90 degrees; and as a consequence, the volumetric efficiency of such capacitor has been found to be relatively low.

The present invention contemplates a variable air-dielectric capacitor having stable electrical losses of extremely small order of magnitude and a volumetric efficiency which is almost three times as great as that of the so-called butterfly-type capacitor, while at the same time maintaining the rotor free from a direct-current connection extending externally of the capacitor.

The principal object of the invention is to increase the volumetric efficiency of a variable air-dielectric capacitor in which the rotor is floating relative to a direct-current connection extending externally of the capacitor.

It is another object to provide electrical losses of high stability and low order of magnitude.

It is a further object to improve the capacitance stability by compensating for an inherent tendency toward the mechanical instability of the rotor when the capacitor is used in fixed, detented, positions.

It is also a further object to distribute uniformly the flow of current to all stators thereby minimizing electrical losses and inductive effects tending to arise in such distribution.

It is also another object to provide effectively the equivalent of a decade capacitor.

It is also a further object to provide external terminals only for the stators constituting a multistator air capacitor.

It is also an object to effect a linear transfer of capacitance between at least two arms of a measuring bridge.

In association with a bridge circuit for measuring unknown admittances generally in the manner disclosed in Patent No. 2,309,490 issued to C. H. Young on January 26, 1943, a specific embodiment of the present invention comprises a variable air-dielectric capacitor including three stators and a rotor rotatable adjacent thereto and free from a direct-current electrical connection extending externally of the capacitor, and having a plurality of external terminals only for the stators.

In the operation of the aforenoted measuring circuit and assuming the normal range of rotation of the rotor is 120 degrees and in such manner that one stator is always overlapped by the rotor, then the capacitance between the rotor and such one stator is always constant whereas the capacitances between the rotor and each of the remaining two stators are differentially adjustable but their sum constitutes always a constant value. In the latter respect, such differential adjustment comprises the sense that whatever amount of capacitance is added to or subtracted from the rotor and one of the last-mentioned two stators then an equivalent amount of capacitance is subtracted from or added to the rotor and the other of the last-mentioned two stators.

A feature of the invention involves the establishment and maintenance of electrical losses of a low order of magnitude because of the absence of a direct-current connection extending from the rotor externally of the capacitor. Another feature concerns the use of three stators of substantially equal angular dimensions and a rotor having an angular dimension approximately equal to the combined dimensions of two adjacent stators whereby the total volumetric efficiency of the capacitor is increased by a factor $8/3$ over the so-called butterfly-type, supra. Still another feature relates to the use of direct-current connections extending only from the stators to the exterior of the capacitor. Another feature involves the use of wedge-shape members for uniformly distributing current flow from the respective stators to the terminals therefor located externally of the capacitor thereby further tending to establish and maintain low electrical losses. Still another feature involves an arrangement of a plurality of banks of rotors, each bank of rotors moving individually, to constitute the equivalent of a capacitor having predetermined, fixed values. In this latter arrangement, a further feature concerns undercutting the angular dimension of the respective rotors so that they overlap slightly less than the equivalent angular dimension of two adjacent stators at a given time thereby tending to increase the capacitance stability of the capacitor by compensating for any mechanical instability inherent in the positioning of the rotors. In this respect, the effective series capacitance between two adjacent stators occasioned by the overlapping of the rotor on the two adjacent stators tends to be held at a constant value.

The invention will be readily understood from the following description when taken together with the accompanying drawing in which:

FIG. 1 is a schematic circuit showing a specific embodiment of the invention included in a bridge measuring apparatus;

FIG. 2 is a schematic representation of the specific embodiment of the invention shown in FIG. 1;

FIGS. 3 and 4 are perspective views of the specific embodiment of the invention shown in FIG. 1;

FIGS. 8 and 9 illustrate schematic circuits inherent in FIGS. 5, 6 and 7.

Figure 4:
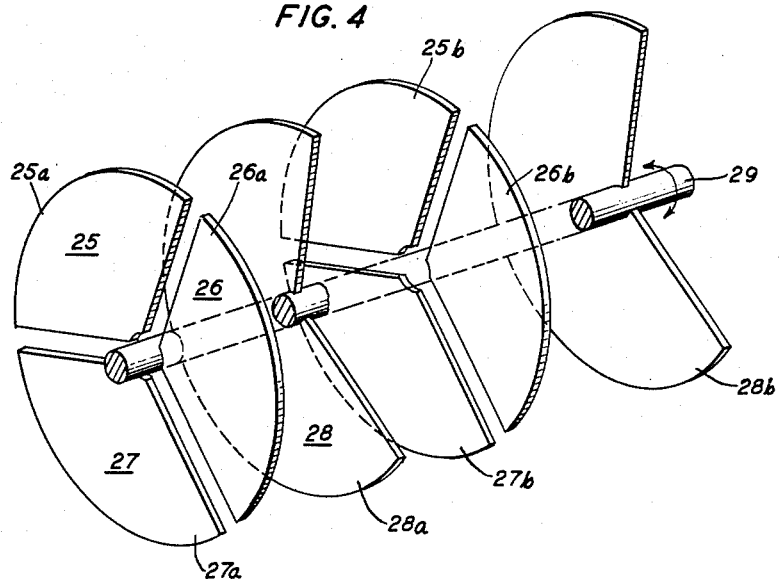

Referring to FIG. 1, there is shown a well-known four-terminal alternating-current bridge comprising terminals A, B, C and D as disclosed in the Young patent, supra, for measuring the value of an unknown admittance $Y_x$ in relation to the value of a known admittance $Y_s$. The bridge includes resistors 10 and 11 in two ratio arms and the known and unknown admittances in the other two arms. A signal source 12 of suitable frequency is coupled via transformer 13 to the vertical bridge diagonal BD while a detector 14 is coupled through transformer 15 to the horizontal bridge diagonal. Arms AB and BC are usually termed the ratio arms and may consist of any convenient form of admittance such, for example, as the aforementioned resistors, and will be assumed to be a unity ratio for the purpose of the instant description of the present invention. The unknown or complex admittance $Y_x$ is connected in arm CD while a standard complex admittance $Y_s$ is disposed in arm AD; and in this connection, it will be apparent that the unknown and standard arms may be interchanged without impairing the measurements.

The bridge will be balanced when the variable standard admittance is adjusted to a value equivalent to that of the unknown admittance. Both admittances, for example, may comprise capacitors. For measuring small values of unknown capacitance, air-dielectric capacitors 20, 21 and 22 arranged in a Y-form may be connected to the bridge terminals A, C and D as disclosed in the Young patent, supra. Capacitor 22 has a fixed amount of capacitance while capacitors 20 and 21 are continuously adjustable via a mechanical connection 23 therebetween whereby capacitance is either removed from arm AD and added to arm CD, or vice versa. Line 24 is a symbolical indication of a rotor which will be further discussed below. A control dial, not shown, included in the mechanical connection is calibrated to indicate directly the capacitance of the unknown admittance for each position of the dial.

In accordance with a specific embodiment of the present invention, the Y-shape air capacitor 20, 21 and 22, shown in FIG. 1, comprises three stators 25, 26 and 27, each having an angular dimension of approximately 120 degrees, and a rotor 28, equivalent to rotor 24, provided with an angular dimension of approximately 240 degrees, as illustrated in FIG. 2. In FIG. 2, stator 25 overlapped by rotor 28 constitutes variable capacitor 20, stator 26 overlapped by rotor 28 forms variable capacitor 21, and stator 27 overlapped by rotor 28 provides fixed capacitor 22, in FIG. 1. The rotor 28 is free from a direct-current connection extending externally of the capacitor, as illustrated in FIG. 2.

Assuming a normal range of rotation of rotor 28 through approximately 120 degrees in opposite directions in such manner that stator 27 is always overlapped thereby and the amount of capacitance therebetween is always a fixed amount. In the rotation of rotor 28, the capacitance between rotor 28 and each of stators 25 and 26 is variable in such manner that whatever capacitance is subtracted from the rotor and stator 25 is added to that between the rotor and stator 26 and the sum of the capacitances of stators 25 and 26 is constant, and vice versa. Thus, if a variable capacitance between 0 degrees and 120 degrees is subtracted from the rotor and stator 25 then an equivalent amount is added to the capacitance between the rotor and stator 26, and vice versa; and the sum of such two capacitances is always a fixed amount. This, therefore, transfers capacitance from bridge arm AD to bridge arm CD, and vice versa, linearly with the position of the shaft carrying rotor 28.

Because of such capacitance transfer, the volumetric efficiency of capacitor shown in FIG. 2 tends to be increased to twice that of the Karplus et al. butterfly capacitor, supra. The fact that each stator of the invention has an angular dimension of 120 degrees rather than the 90 degrees for each stator of the Karplus et al. capacitor, supra, tends to contribute a further increase in the volumetric efficiency of the Y-shape capacitor of the invention over that of the Karplus et al. capacitor, supra, by a factor 4/3. As a consequence of the foregoing, the total volumetric efficiency of the Y-shape capacitor according to the invention tends to be increased over that of the Karplus et al. butterfly capacitor, supra, by a factor 8/3.

Obviously, the rotor of the Y-shaped capacitor shown in FIGS. 1 and 2 could also be provided with rotation through 240 degrees in opposite directions whereby the rotor 28 in FIG. 2 could be caused to overlap each of stators 25, 26 and 27 in succession. In such case, a variable capacitance could also be established across the primary winding of transformer 15 and thereby across the horizontal bridge diagonal as rotor 28 is rotated adjacent to the respective stators 25, 26 and 27 in turn in FIG. 2. However, as the variable capacitance established across transformer 15 does not affect the balance of the bridge during its use for actual measurements for the purpose aforementioned, but affects only the bridge sensitivity to a minor extent, such a method of use may be used in the manner described below.

Referring to FIGS. 2, 3 and 4, it is seen that each stator and the rotor may comprise a bank of plates, that is, stator 25 may comprise at least plates 25a and 25b, stator 26 may include at least plates 26a and 26b, stator 27 may consist of at least plates 27a and 27b, and rotor 28 may embody at least plates 28a and 28b. As illustrated in FIG. 4, the plates of the respective stators are fixedly located about but not engaged with shaft 29, whereas the plates of the rotor are fixedly attached thereto for rotation therewith adjacent to the stators. As hereinbefore mentioned, the rotation of the rotor may be limited to 120 or 240 degrees in opposite directions, and is also free from a direct-current connection extending therefrom via the shaft to a terminal lying externally of the capacitor. The absence of such connection eliminates current flow from the rotor via the shaft thereby tending to minimize electrical loss from this source in the capacitor.

At the same time, terminals 30, 31 and 32 provided for stators 25, 26 and 27, respectively, are located externally of capacitor thereby providing the latter only with three external terminals, as illustrated in FIGS. 2 and 3. Referring to FIG. 3, it is seen that a wedge-shape member 33 connects the aforenoted plurality of plates forming stator 26 to inner conductor 34 at one end of a coaxial cable 35 while a similar wedge-shape member 36 connects a plurality of plates constituting stator 27 to the outer conductor at the same one end of the coaxial cable. The opposite end of the coaxial cable is terminated at ground 38 on its outer conductor and a point 39 on the inner conductor whereby a terminal 31, for example, is constituted for stator 26 externally of the capacitor. In a similar manner, additional wedge-shape members and coaxial cables are used to constitute terminals 30 and 32 for stators 25 and 26, respectively, shown in FIGS. 2 and 3. These wedge-shape members provide a substantially uniform distribution of current flow from the respective coaxial cables to the stators connected therewith.

From the foregoing, it is thus apparent that the rotor shown in FIGS. 2 and 3 could be rotated in either direction in such an amount which is at least sufficient to provide a capacitance variation effective substantially from 0 degrees through 120 degrees at each of at least terminals 30 and 31 shown in FIGS. 2 and 3; and that the rotor could be continuously rotated through 240 degrees to provide a capacitance variation effective substantially from 0 degrees through 120 degrees at each of said terminals 30, 31 and 32 shown in FIGS. 2 and 3.

In the establishment of each of terminals 30, 31 and 32 in the foregoing manner, it will be apparent that the inner conductor of each coaxial cable is connected only to one stator while the outer conductor of the same coaxial cable is connected only to one other stator. It will thus be observed that the wedge-shape members are disposed substantially in parallel for establishing minimal inductance therebetween and minimal electrical loss due to current flow therein. This loss may be held to extremely small values by a proper design of the wedge-shape members and selection of suitable current transmitting surfaces therefor.

Figure 5:
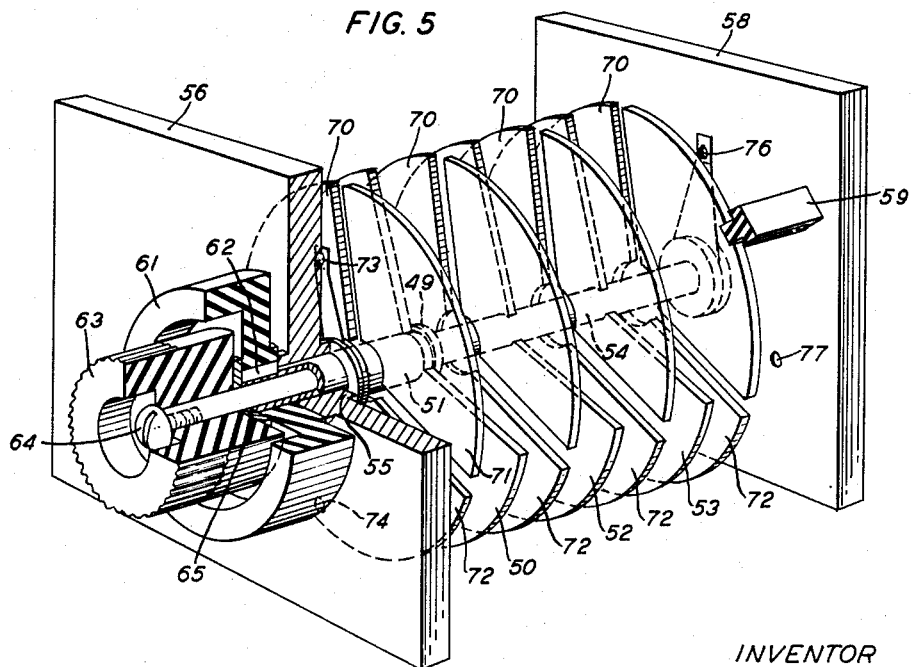
FIG. 5 is a perspective view of a modification of the specific embodiment of the invention shown in FIGS. 1 through 4.
Figure 6:
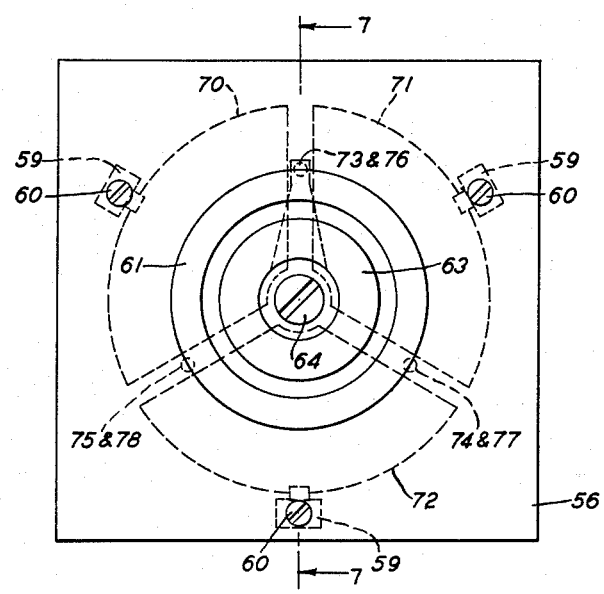
FIG. 6 is a front view taken along line 6—6 in FIG. 7.
Figure 7:
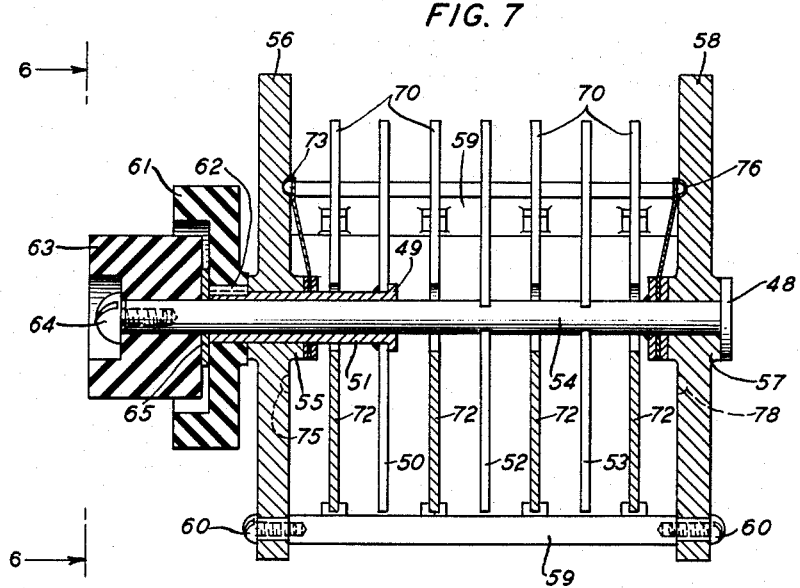
FIG. 7 is a sectional view taken along line 7—7 in FIG. 6.

A capacitor with a plurality of fixed values may be provided by disposing a plurality of rotors or groups of rotors on a plurality of shafts in such manner that each rotor or group of rotors is arranged to rotate individually on its own shaft adjacent to the same stators, all shafts being coaxially disposed, as illustrated in FIGS. 5, 6 and 7. This capacitor may comprise, for example, rotor 50 fixedly mounted on hollow shaft 51 adjacent to shoulder 49, and rotors 52 and 53 fixedly secured to shaft 54 which is positioned interiorly of and coaxially with shaft 51. Each of rotors 50, 52 and 53 is identical with rotor plate 28a shown in FIG. 4. Shaft 51 is suitably mounted for rotation in bearing 55 formed in a central portion of dielectric plate 56 while one end of shaft 54 is rotatably mounted in the shaft 51 and its opposite end is rotatably mounted in bearing 57 formed in a central portion of dielectric plate 58. An integral shoulder 48 formed on the opposite end of shaft 54 maintains it in bearing 57. Plates 56 and 58 are held in spaced relation by a plurality of dielectric rods 59, 59 secured thereto by screws 60, 60. Shaft 51 is rotated by finger knob 61 fixedly mounted thereon by key 62. Shaft 54 is rotatable by a finger knob 63 attached to the one end thereof by screw 64. Washer 65 disposed on shaft 54 between the two knobs tends to permit independent rotation of the associated shafts 51 and 54.

Associated with rotor 50 are stators 70, 71 and 72, which are identical with stators 25, 26 and 27, respectively, shown in FIG. 4. A similar set of stators 70, 71 and 72 is associated with each of rotors 52 and 53. Rotor 50 is provided with detents 73, 74 and 75 mounted in 120-degree spaced relation on an inner surface of plate 56 while rotors 52 and 53 are also provided with detents 76, 77 and 78 mounted in 120-degree spaced relation on an inner surface of plate 58. The detents 76, 77 and 78 are identical in structure with but oppositely disposed from detents 73, 74 and 75, respectively, looking in the direction from plate 56 toward plate 58.

The detents 73, 74 and 75 are so arranged that rotor 50 may be rotated to exclude meshing with any one of its associated stators 70, 71 and 72, while fully meshing with the remaining two stators at a given time. In such event, the two fully-meshing positions would correspond with the extreme rotation of a continuously variable capacitor while the non-meshing position would correspond with a new variation of capacitance. In a similar manner, detents 76, 77 and 78 are so arranged that the respective rotors 52 and 53 may be rotated to exclude meshing with any one of the associated stators 70, 71 and 72, while fully meshing with the remaining two stators in the corresponding sets of the latter stators at a given time to provide the capacitance just mentioned regarding rotor 50 and its associated stators 70, 71 and 72. The capacitance may be thus transferred from bridge arm AD to bridge arm CD, and vice versa, as hereinbefore explained in regard to FIGS. 1, 2 and 3. By so arranging a number of rotors or groups of rotors in the manner described above regarding FIGS. 5, 6 and 7, there will be provided the electrical equivalent of a decade capacitor while at the same time omitting the use of sliding contacts which are normally used therewith.

Heretofore, detented capacitors of the type disclosed in FIGS. 5, 6 and 7 tended to involve mechanical instability in the detent positions thereby tending to provide a corresponding instability of capacitance. In the present invention, stability of capacitance in view of the possible mechanical instability is achieved by undercutting the rotors so that they are each slightly less than a 240° sector. This will have two effects. First, it will shield the edges of the rotor from the unused stator; and second, to a first order, it will keep the sum of the capacitances of the other two sectors constant. To illustrate, consider the capacitances between the points A, C, and D shown in FIG. 1 and further shown in FIG. 8. It can be shown that these capacitances can be replaced by the equivalent circuit shown in FIG. 9.

The capacitance values of FIG. 9 may be given by:

$$C_{AD} = \frac{C_A C_D}{C_A + C_C + C_D} \quad (1)$$

$$C_{CD} = \frac{C_C C_D}{C_A + C_C + C_D} \quad (2)$$

$$C_{AC} = \frac{C_A C_C}{C_A + C_C + C_D} \quad (3)$$

Consider the capacitance $C_{AD}$. By the above, capacitances $C_C$ and $(C_A + C_D)$ are constant. Hence for small instabilities $\delta C_A$ and $\delta C_D$ in $C_A$ and $C_D$, we have:

$$C_{AD} + \delta C_{AD} = \frac{(C_A + \delta C_A)(C_D + \delta C_D)}{C_A + C_C + C_D} \quad (4)$$

where $\delta C_{AD}$ is the resultant instability in $C_{AD}$.

Since $C_A + C_D = $ constant, $$\delta C_A = \delta C_D$$

and when $C_A = C_D$ $$\frac{\delta C_{AD}}{C_{AD}} = -\left(\frac{\delta C_A}{C_A}\right)^2$$

Hence the relative instability of the effective capacitance, $$\frac{\delta C_{AD}}{C_{AD}}$$

depends upon the square of the relative instability of the actual capacitance, $$\frac{\delta C_A}{C_A}$$

and if the latter quantity were reasonably small, say, for example, of the order of 1%, then the former quantity would be exceedingly small, of the order of one hundredth of one percent.

It is to be further understood that the above-described embodiments are merely illustrative of the application of the principles of the invention. Numerous other arrangements may be devised by those skilled in the art without departing from the spirit and scope of the invention.

What is claimed is:

1. A variable capacitor comprising a stator including three sectors, each having an angular dimension of approximately 120 degrees, an external electrical terminal for each of said sectors, a rotor comprising a sector having an angular dimension of approximately 240 degrees and free from an external electrical terminal, said stator and rotor sectors assembled on a common axis, said rotor sector having a range of rotation limited approximately to 120 degrees on said axis in such a manner that said rotor sector overlaps a first of said stator sectors at all times and simultaneously therewith overlaps variably a second of said stator sectors in one sense and a third of said stator sectors in an opposite sense whereby said rotor sector provides a fixed amount of capacitance with said first stator sector at the external terminal connected thereto and differential amounts of capacitance with said second and third stator sectors at the respective external terminals connected thereto, the sum of said differential amounts of capacitance being a constant value.

2. The variable capacitor according to claim 1 in which said rotor sector has a range of rotation limited approximately to 240 degrees on said axis for overlapping each of said stator sectors in succession in such a manner that said rotor sector overlaps one of said stator sectors at all times and variably overlaps a first stator sector on one side of said one stator sector in one sense and a second stator sector on the other side of said one stator sector in an opposite sense whereby said rotor sector provides a fixed amount of capacitance with said last-mentioned one stator sector at the external terminal connected thereto and differential amounts of capacitance with said last-mentioned first and second stator sectors at the respective external terminals connected thereto, the sum of said differential amounts of capacitance being a constant value.

3. The capacitor according to claim 2 which includes a plurality of stators, each including said three sectors, each of said stators so assembled on one side of said rotor sector on said axis that corresponding sectors of said last-mentioned stators are opposed to each other and connected to one of said external terminals, said rotor sector having a range of rotation limited approximately 240 degrees on said axis for overlapping each group of corresponding stator sectors in succession in such manner that said rotor sector overlaps one group of said corresponding stator sectors at all times and variably overlaps a first group of said corresponding stator sectors on one side of said one stator sector group in one sense and a second group of said corresponding stator sectors on the other side of said one sector group in an opposite sense whereby said rotor sector provides a fixed amount of capacitance with said last-mentioned one stator sector group at the external terminal connected thereto and differential amounts of capacitance with said last-mentioned first and second sector groups at the respective external terminals connected thereto, the sum of said differential amounts of capacitance being a constant value.

4. The capacitor according to claim 1 which includes a plurality of stators, each including said three sectors, each of said stators so assembled on one side of said rotor sector on said axis that corresponding sectors of said last-mentioned stators are opposed to each other and connected to one of said external terminals, said rotor sector having a range of rotation limited approximately 120 degrees for overlapping a first group of corresponding stator sectors at all times and simultaneously therewith variably overlapping a second group of corresponding stator sectors in one sense and a third group of corresponding stator sectors in an opposite sense whereby said rotor sector provides a fixed amount of capacitance with said first group of corresponding stator sectors at the external terminal connected thereto and differential amounts of capacitance with said second and third groups of corresponding stator sectors at the respective external terminals connected thereto, the sum of said differential amounts of capacitance being a constant value.

5. The capacitor according to claim 4 in which a first of said external terminals comprises a first coaxial conductor having an inner conductor and an outer conductor, and a first pair of flat members, one of said first members connecting said first inner conductor to corresponding sectors of said two stators, and the other of said first members connecting said first outer conductor to other corresponding sectors of said two stators, and a second of said external terminals comprises a second coaxial conductor having an inner conductor and an outer conductor, and a second pair of flat members, one of said second members connecting said second inner conductor to further corresponding sectors of said two stators, and the other of said second members connecting said second outer conductor to said other corresponding stator sectors.

6. The capacitor according to claim 5 in which said members of each pair of said flat members are disposed substantially in parallel for establishing minimal inductance therebetween.

7. The capacitor according to claim 6 in which each member of each of said pairs of flat members has a wedge-shape for substantially uniformly distributing current flow from said coaxial cable to said plates of said stators.

8. A variable capacitor comprising a plurality of discrete stators, each including a bank of sectoral plates, each having an angular dimension of approximately 120 degrees, said banks of stator plates so mounted in spaced relation on a common axis as to dispose corresponding plates in opposing relation, external electrical terminals connected to groups of corresponding stator sectoral plates in said banks, and a unitary rotor comprising a plurality of spaced sectoral plates, each having an angular dimension of approximately 240 degrees, each of said rotor plates mounted alternately to one of said stator plates on said common axis, said rotor plates mounted in opposing relation on said common axis and free from an external electrical terminal, said rotor plates rotatable through 120 degrees on said common axis for overlapping a first group of corresponding stator plates at all times to provide a fixed amount of capacitance therewith at the external terminal connected thereto and at the same time for variably overlapping a second group of corresponding stator plates in one sense and a third group of corresponding stator plates in an opposite sense to provide differential amounts of capacitance with said second and third groups of corresponding stator plates at the respective external terminals connected thereto, the sum of said differential amounts of capacitance being a constant value.

9. The capacitor according to claim 8 in which one of said external electrical terminals is connected to one sectoral stator plate of each of said stator banks, each of said rotor sectoral plates constituting a discrete rotor associated with an individual stator bank on said common axis and free from an external electrical terminal, each of said discrete rotor plates rotatable independently of the other on said common axis in a range of approximately 120 degrees in such manner that each of said rotor plates overlaps one stator plate of one of said stator banks at all times and simultaneously therewith variably overlaps a second stator plate of said one stator bank in one sense and a third stator plate of said one stator bank in an opposite sense whereby each of said rotor plates provides a fixed amount of capacitance with said last-mentioned one stator plate of said one stator bank at the external terminal connected thereto and differential amounts of capacitance with said last-mentioned second and third stator plates of said one stator bank at the respective external terminals connected thereto, the sum of said differential amounts of capacitance being a constant value.

10. The capacitor according to claim 8 in which each of said rotor sectoral plates constitutes a discrete rotor associated with an individual stator bank on said common axis and is free from an external electrical terminal, each of said discrete rotor plates rotatable independently of the other on said common axis in a range of approximately 240 degrees for overlapping different individual stator plates in succession in such manner that each of said rotor plates overlaps one stator plate of one of said stator banks at all times and simultaneously therewith variably overlaps a first stator plate adjacent to said one stator plate in one sense and a second stator plate adjacent to said one stator plate in an opposite sense whereby each of said rotor plates provides a fixed amount of capacitance with said last-mentioned one stator plate at the external terminal connected thereto and differential amounts of capacitance with said last mentioned second and third stator plates at the respective external terminals connected thereto, the sum of said differential amounts of capacitance being a constant value.

11. A variable capacitor comprising a plurality of discrete stators, each including a bank of sectoral plates, each having an angular dimension of approximately 120 degrees, said banks of stator plates so mounted in spaced relation on a common axis as to dispose corresponding plates of the respective stator banks in opposing relation, and a plurality of rotors, a first of said rotors comprising one sectoral plate having an angular dimension of 240 degrees and mounted between the individual plates of one pair of said stator banks for rotation on said common axis, a second of said rotors having at least two sectoral plates, each mounted alternately to one stator bank of another pair of said stator banks for rotation on said common axis, each of said second rotor plates having an angular dimension of 240 degrees, said first and second rotor plates rotatable through a range of 240 degrees on said common axis independently of each other for overlapping groups of corresponding plates of the respective one and other pairs of stator banks in succession, each of said first and second rotor plates rotatable to overlap a first group of corresponding stator plates of the respective one and other pairs of stator banks to provide a fixed amount of capacitance between each of said first and second rotor plates and said first group of corresponding stator plates associated therewith in the respective one and other pairs of stator banks and to overlap variably a second group of corresponding stator plates in one sense and a third group of corresponding stator plates in an opposite sense for providing differential amounts of capacitance between each of said first and second rotor plates and said second and third groups of corresponding stator plates associated therewith in the respective one and other pairs of stator banks, the sum of said differential amounts of capacitance between each of said first and second rotor plates and said second and third groups of corresponding stator plates associated therewith in the respective one and other pairs of stator banks being a constant value.

12. The capacitor according to claim 11 which includes a first plurality of stops associated with said first rotor plate and spaced 120 degrees apart for causing said first rotor plate to overlap only two of said groups of corresponding stator plates of said one pair of stator banks at a given time as said first rotor plate is rotated to a fixed position at each of said first stops thereby providing a first fixed amount of capacitance between said first rotor plate and said last-mentioned two stator plate groups, and a second plurality of stops associated with said second rotor plates and spaced 120 degrees apart for causing said second rotor plate to overlap only two of said groups of corresponding stator plates of said other pair of stator banks at a given time as said second rotor plate is rotated to a fixed position at each of said second stops thereby providing a second fixed amount of capacitance between said second rotor plates and said last-mentioned two stator plate groups, whereby said first and second fixed amounts of capacitance provide said capacitor with a plurality of fixed amounts of capacitance.

13. The capacitor according to claim 12 in which each of said first and second rotor plates has an angular dimension which is slightly less than 240 degrees to minimize capacitance variations tending to occur between said last-mentioned rotor plates and the two respective groups of corresponding stator plates overlapped thereby at the given time because of a tendency toward mechanical instability of said last-mentioned rotor plates at each of the stops of the respective pluralities of stops associated therewith.

References Cited by the Examiner

UNITED STATES PATENTS

| | | | |
|---|---|---|---|
| 2,223,061 | 11/40 | Ducati | 317—253 |
| 2,439,255 | 4/48 | Longfellow | 317—253 X |
| 2,732,498 | 1/56 | Pfund | 317—253 |
| 2,864,946 | 12/58 | Achenbach | 334—84 |
| 2,873,415 | 2/59 | Nilsen | 317—253 |

FOREIGN PATENTS

| | | |
|---|---|---|
| 547,372 | 3/32 | Germany. |
| 826,732 | 1/60 | Great Britain. |

LARAMIE E. ASKIN, *Primary Examiner.*

JOHN F. BURNS, *Examiner.*